United States Patent [19]

Fujimura

[11] Patent Number: 4,754,120
[45] Date of Patent: Jun. 28, 1988

[54] METHOD OF REGULATING THE TEMPERATURE OF A BODY TO BE HEATED

[75] Inventor: Takashi Fujimura, Mobara, Japan

[73] Assignee: Hitachi, Ltd., Tokyo, Japan

[21] Appl. No.: 768,312

[22] Filed: Aug. 22, 1985

[30] Foreign Application Priority Data

Aug. 24, 1984 [JP] Japan .................. 59-174891

[51] Int. Cl.⁴ .............................................. H05B 3/00
[52] U.S. Cl. .................................................. 219/354
[58] Field of Search ............... 219/354, 346, 349, 347, 219/345, 358; 250/493.1

[56] References Cited

U.S. PATENT DOCUMENTS

| 2,340,354 | 2/1944 | Wells | 219/354 |
|---|---|---|---|
| 2,651,702 | 9/1953 | Burke et al. | 219/354 |
| 3,103,574 | 9/1963 | Chellis et al. | 219/349 |
| 3,157,728 | 11/1964 | Comstock, Jr. | 219/349 |
| 3,246,838 | 4/1966 | Bauer | 219/358 |
| 3,292,418 | 12/1966 | Oehme et al. | 219/349 |
| 3,384,526 | 5/1968 | Abramson et al. | 219/346 |
| 3,475,592 | 10/1969 | Berkl | 219/346 |
| 3,517,160 | 6/1970 | Maga | 219/354 |
| 3,602,693 | 8/1971 | Grounuer | 219/354 |
| 3,694,624 | 9/1972 | Buchta | 219/358 |
| 3,805,019 | 4/1974 | Gorishek | 219/354 |
| 3,864,847 | 2/1975 | Friedman et al. | 219/354 |
| 4,486,652 | 12/1984 | Muka et al. | 250/493.1 |
| 4,500,773 | 2/1985 | Hanson et al. | 219/354 |
| 4,556,783 | 12/1985 | Naruse et al. | 219/354 |
| 4,605,161 | 8/1986 | Motomiya et al. | 219/388 |

FOREIGN PATENT DOCUMENTS 311224  12/1929  United Kingdom ................ 219/354

OTHER PUBLICATIONS

"Facts About Modern Infrared", by Fostoria Corporation, pp. 1–8, Apr. 1961.
"Infrared Farm Equipment by AFCO", Jul. 1952.

Primary Examiner—A. D. Pellinen
Assistant Examiner—Geoffrey S. Evans
Attorney, Agent, or Firm—Antonelli, Terry & Wands

[57] ABSTRACT

A heating apparatus equipped with a heater for heating a body to be heated and a heater-moving device is controlled to change the distance between the heater and the body to be heated in dependence upon the size and heat capacity of the body to be heated, so that the body is heated at a desired temperature elevating rate. This method is capable of treating bodies having different sizes and different heat capacities at a predetermined constant temperature at all times.

5 Claims, 4 Drawing Sheets

METHOD OF REGULATING THE TEMPERATURE OF A BODY TO BE HEATED

BACKGROUND OF THE INVENTION

The present invention relates to a method of regulating the temperature, by which the temperature of heated bodies having different heat capacities can be always regulated to a predetermined constant temperature.

When bodies to be heated (hereinafter referred to as bodies) are heated at a predetermined temperature by a heater, in general, the required amount of heat changes depending upon the initial temperature of the bodies, heat quantity of the heater, ambient temperature of the bodies, and the heat capacities of the bodies. In particular, when the heater is not in contact with the bodies but a finite gap exists therebetween, or when bodies have different sizes, weights and specific heats, for maintaining the bodies at a predetermined temperature at all times, it is necessary to find the heating conditions through experiments and to determine the heat quantity of the heater each time.

However, when bodies having different heat capacities and, particularly, having different sizes, different weights and/or different specific heats, are successively passed through the steps, it is required to change the heat quantity of the heater every time.

The greater the heat capacity of the heater, however, the slower the response speed of the heater in regard to its temperature. In the case of a heater having output of about 6 KW, for instance, a time of about 20 minutes is required to raise the temperature from room temperature to about 250° C., and a time of about 5 minutes is required to lower the temperature from about 250° C. to about 200° C.

Therefore, the control method becomes quite difficult where it is desired to heat bodies that flow successively through the steps and that have different sizes, different weights and different specific heats, e.g., where it is desired to heat panels of color picture tubes having such different sizes as 14 inches, 20 inches, 26 inches and the like at a predetermined temperature and at high speeds at all times.

That is, in manufacturing color picture tubes, as is well known, the panel temperature serves as the most important process factor in the process for forming phosphor screens such as in the step of forming black (light-absorbing) matrix and in the step of applying phosphor, and seriously affects three requirements, i.e., affects characteristics, yields and quality of the products.

A panel of 6-inch picture tube weighs 316 grams and has a maximum diameter of 150 mm, and a panel of 26-inch picture tube weighs 13610 grams and has a maximum diameter of 663 mm. Here, if the heater has an output of 6 KW and the distance is 100 mm between the panel and the heater, the temperature elevating rate (dT/dt, where T denotes the temperature and t denotes the time) per unit time is 2.4° C./sec. for the panel of 6-inch picture tube and 0.08° C./sec. for the panel of 26-inch picture tube, the difference being about 40 times.

SUMMARY OF THE INVENTION

The object of the present invention is to provide a method of regulating the temperature, which is free from difficulties involved in the conventional art, and which is capable of heating bodies having different sizes, different weights and/or different specific heats at a predetermined temperature at all times. Particularly, the object of the present invention is to provide a method of regulating temperature, which processes picture tube panels of dissimilar sizes at a predetermined temperature at all times, making it possible to produce picture tube panels of many kinds simultaneously maintaining high precision.

To achieve the above objects, the method of regulating the temperature of the present invention comprises (i) a step for placing a body to be heated close to a heater that heats said body to be heated, (ii) a step for moving said heater to a position away from said body to be heated by such a distance that said body is heated at a desired temeprature elevating rate, and (iii) a step for heating said body to be heated by said heater for a predetermined period of time.

That is, the method of regulating the temperature according to the present invention employs a heating apparatus equipped with a heater for heating a body to be heated, and a heater-moving device for varying the distance between the heater and the body to be heated, and wherein the distance is varied depending upon the size, weight and specific heat of the body to be heated, in order to regulate the temperature elevating rate of the body to be heated per unit time.

In order to heat the bodies having different sizes, weights and/or specific heats at a predetermined temperature elevating rate, therefore, it is necessary to vary the distance between the bodies to be heated and the heater in the above-mentioned step (ii) depending upon the sizes, weights and specific heats. The distance required for the bodies can, generally, be found through simple experiments. Namely, the distance required for heating the individual bodies at a predetermined temperature within a predetermined period of time may be found for the individual bodies through experiments. As will be described later, the distance can be found by calculation, or the experiments mentioned above can be partly substituted by calculation. It is further allowable to measure the temperature of the body while heating it, and input the measured temperature of the body to a control circuit of the heater-moving device, in order to maintain a proper distance at all times.

The aforementioned step (i) can be generally fulfilled by placing the body to be heated in front of the heater.

If the aforementioned method of regulating the temperature of the present invention is used for heating the bodies, it is made possible to heat the bodies at a predetermined temperature at predetermined periods of heating time without changing the quantity of heat generated by the heater, in successively heating a plurality of bodies having different sizes or different heat capacities.

Preferred examples of the bodies to be heated include color picture tube panels of various sizes.

DESCRIPTION OF THE PREFERRED EMBODIMENTS

First, a fundamental principle of the method of regulating the temperature of the present invention will be described below in detail.

Figure 1:
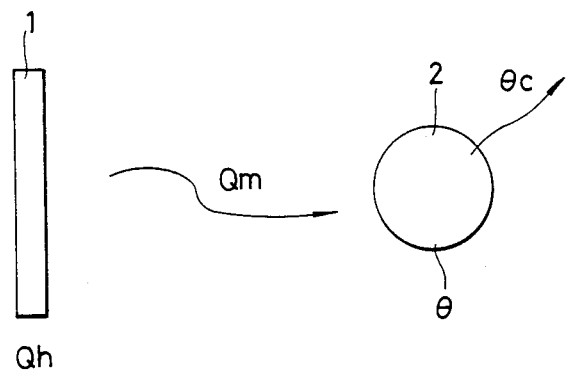
FIGS. 1 and 2 are schematic diagrams illustrating a relation between a heater and a body to be heated to explain a fundamental principle of the present invention.

FIG. 1 is a schematic diagram showing a relation between a heater and a body to be heated to explain the method of regulating the temperature according to the present invention, wherein reference numeral 1 denotes a heater, and 2 denotes a body to be heated. Here, if the heat quantity emitted from the heater 1 is denoted by Qh, the heat quantity transmitted to the body 2 by Qm and the conduction efficiency therebetween by K, there holds a relation, $$Qm = K \cdot Qh$$

Here, if the heat quantity of the body 2 is denoted by $\theta$, the heat quantity in the room by $\theta c$, and the specific heat of the body 2 by C, the equation of heat of a very short time dt is given by, $$K \cdot Qh \, dt - \frac{1}{R} (\theta - \theta c) dt = C \, d\theta$$

Therefore, $$K \cdot Qh - \frac{1}{R} (\theta - \theta c) = C \, d\theta/dt$$

where R denotes thermal resistance.

Since $\theta = mCT$, the relation of heat is given by, $$K \cdot Qh - \frac{1}{R} (T - T_c) = mC \frac{dT}{dt}$$

Further, since $K \cdot Qh >> -(T - T_c)$, there holds, $$K \cdot Qh \approx mC \frac{dT}{dt}$$

and hence, $$\frac{dT}{dt} = \frac{K}{mC} Qh$$

where T denotes the temperature of the body 2, Tc denotes the temperature in the room, and m denotes the weight of the body 2.

Figure 2:
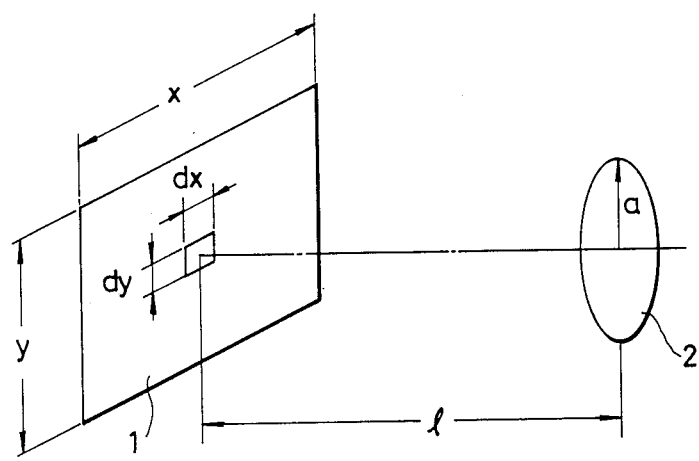

The conduction efficiency K is considered below with reference to a schematic diagram of FIG. 2. If the heat radiated from a very small area dS of the heater 1 is denoted by $Q_T$, the heat quantity of Qm transmitted from the very small area dS consisting of dx and dy of the heater 1 to a disc body 2 of a radius a which is remote by a distance l, is given by $$Qm = \int_S \frac{\omega(x, y, z)}{4\pi} Q_T \, dx \cdot dy$$

where $\omega$ denotes a solid angle when the body 2 is viewed from the very small area dS of the heater 1, and S denotes an area x·y of the heater 1.

Further, since $$Qh = \frac{1}{2} \int_S Q_T \, dx \cdot dy$$

there hold, $$Qm \approx \int\int \frac{\omega}{4\pi} Q \, dx \cdot dy \approx \frac{Q}{4\pi} \omega S$$

$$Qh \approx \int\int \frac{Q}{2} \, dx \cdot dy \approx \frac{1}{2} QS$$

Therefore, since $Q = K \cdot Qh$, there holds the following relation, $$K = \frac{Qm}{Qh} = \frac{\omega}{2\pi}$$

Here, if it is considered that the body 2 is a flat disc having a radius a, the solid angle $\omega$ is given by, $$\omega = 2\pi \left( 1 - \frac{l}{\sqrt{l^2 + a^2}} \right)$$

and finally, there is obtained a relation, $$\frac{dT}{dt} = \frac{K}{mC} Qh = \frac{2\pi \left( 1 - \frac{l}{\sqrt{l^2 + a^2}} \right)}{\frac{2\pi}{mC}} Qh$$

$$= \frac{Qh}{mC} \left( 1 - \frac{l}{\sqrt{l^2 + a^2}} \right)$$

Therefore, the temperature elevating rate dT/dt per unit time varies in proportion to the relation Qh/mC of weight m, specific heat C of the body 2, and heat quantity Qh of the heater 1, and also varies in proportion to the relation $$\left( 1 - \frac{l}{\sqrt{l^2 + a^2}} \right)$$

of radius a of the body 2 and distance l between the body 2 and the heater 1.

According to the method of regulating the temperature of the present invention, therefore, the distance l is so controlled that the temperature elevating rate dT/dt given by the following equation, $$\frac{dT}{dt} = \frac{Qh}{mC}\left(1 - \frac{l}{\sqrt{l^2 + a^2}}\right)$$

becomes constant, so that the temperature of bodies can be regulated at an increased rate, when the bodies 2, e.g., picture tube panels having different sizes, different weights, and/or different specific heats are allowed to flow successively through the steps.

In principle, the distance l can be calculated by the above equation. As mentioned earlier, however, the distance l can be easily found through experiments. When the distance l under given conditions have been found through experiments, furthermore, the distance l of when some factors are changed can be calculated from the experimentally found values and from the above equation.

To move the heater 1 to a position which is at a desirable distance from the body 2, the kind of body should be determined by eyes and the operation should be so effected that the heater moves to a position which is at a desirable distance therefrom. For instance, the heater should be moved to a position having a suitable distance from the body by selectively depressing the heater-moving buttons corresponded to the bodies of which the shapes and properties have been known beforehand. Determination of the kinds of bodies and instructions for moving the heater may be automatically carried out instead of relying upon the visual decision. Moreover, the order of kinds of bodies to be succesively fed may be determined in advance, and the heater may be automatically moved to suitable positions according to the program. It is further possible to measure the temperature of body 2, to move the heater away from the body when the measured temperature is higher than a predetermined temperature, and to move the heater toward the body when the measured temperature is lower than the predetermined temperature.

EXAMPLE 1

Figure 3A:
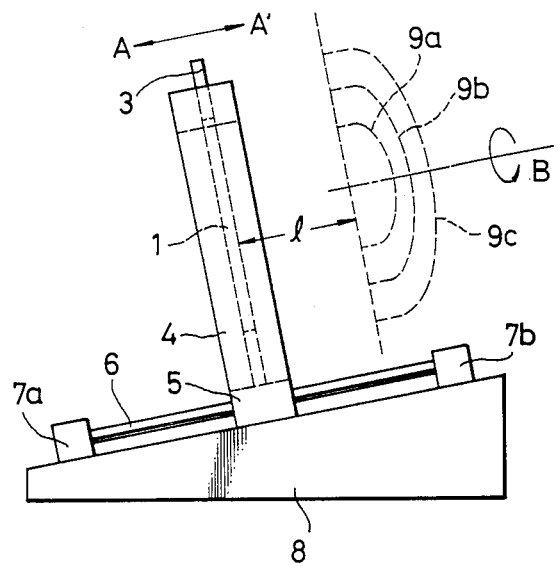
FIG. 3a is a side view showing a major portion of a heating apparatus employed for regulating the temperature according to an embodiment of the present inveniton.
Figure 3B:
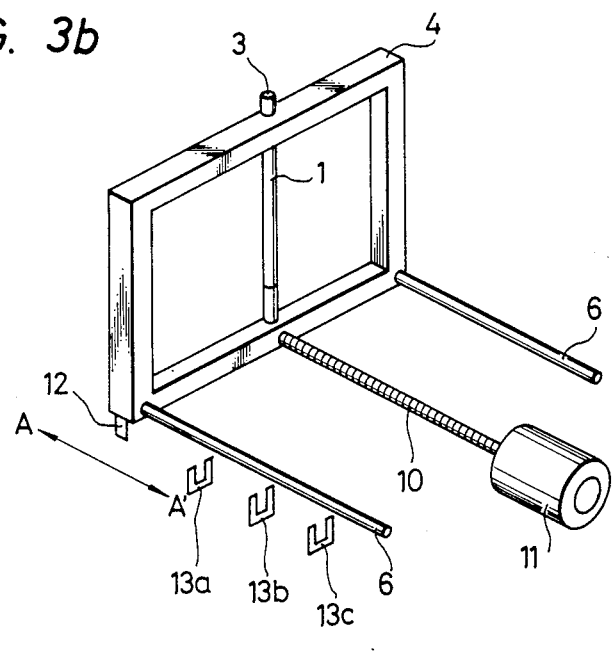
FIG. 3b is a perspective view showing a major portion of the heating apparatus employed for regulating the temperature according to an embodiment of the present invention.

FIGS. 3a and 3b are diagrams showing a heater-moving device used for the method of regulating the temperature of the present invention, wherein FIG. 3a is a side view showing a major portion and FIG. 3b is a perspective view showing a major portion.

First, in FIG. 3a, reference numeral 3 denotes a stand which supports an electric heater 1 that radiates about 6 KW of output, 4 denotes a frame covering the periphery of the heater 1, 5 denotes a moving member which supports the stand 3, which moves in the directions of arrow A-A' and which is formed together with the frame 4 as a unitary structure, 6 denotes guide rails for sliding the moving member 5, 7a and 7b denote stoppers for the moving member 5, 8 denotes a bedplate, and reference numerals 9a, 9b, 9c denote a panel for a 14-inch picture tube, a panel for a 20-inch picture tube, and a panel for a 26-inch picture tube of which the inner sides are faced to the heater 1 maintaining a distance l. These panels 9a, 9b, 9c are individually turned in the direction of arrow B, and are successively fed into the steps. These panels 9a, 9b, 9c correspond to the body 2 of FIGS. 1 and 2. In FIG. 3b, reference numeral 10 denotes a worm screw engaged with the moving member 5, and 11 denotes a drive motor coupled to the worm screw 10. The drive motor 11 runs in the forward direction or in the reverse direction to move the moving member 5 mounting the heater 1 in the direction of arrow A-A', i.e., to eventually move the frame 4 in the direction of arrow A-A'. Reference numeral 12 denotes a shutter disposed at an end of the frame 4, and reference numerals 13a, 13b, 13c denote position detecting sensors that are arranged between the frame 4 mounting the heater 1 and the opposing panels 9a, 9b, 9c being separated away from the position of panels by a predetermined distance, and which detect the position of the frame 4 when the shutter 12 has passed through the recessed portions thereof, so that the frame 4 can be stopped at a predetermined position.

Figure 4:
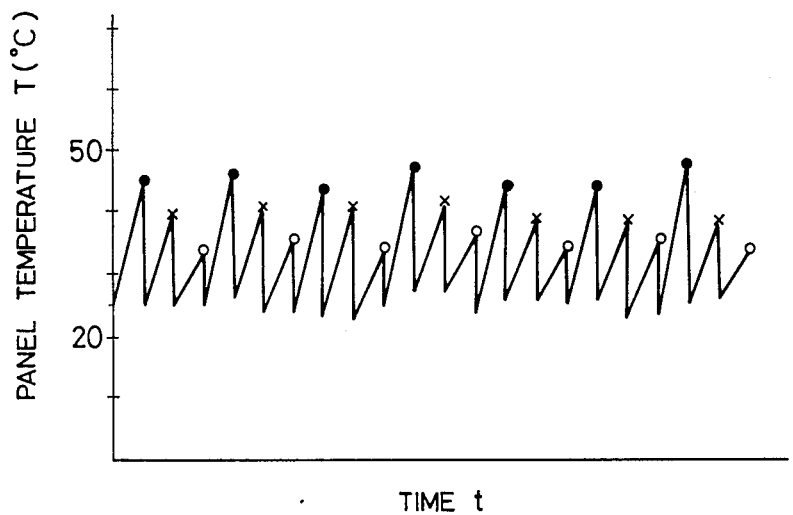
FIG. 4 is a graph showing the change of panel temperatures of color picture tubes with the passage of time when a conventional heating method is employed.
Figure 5:
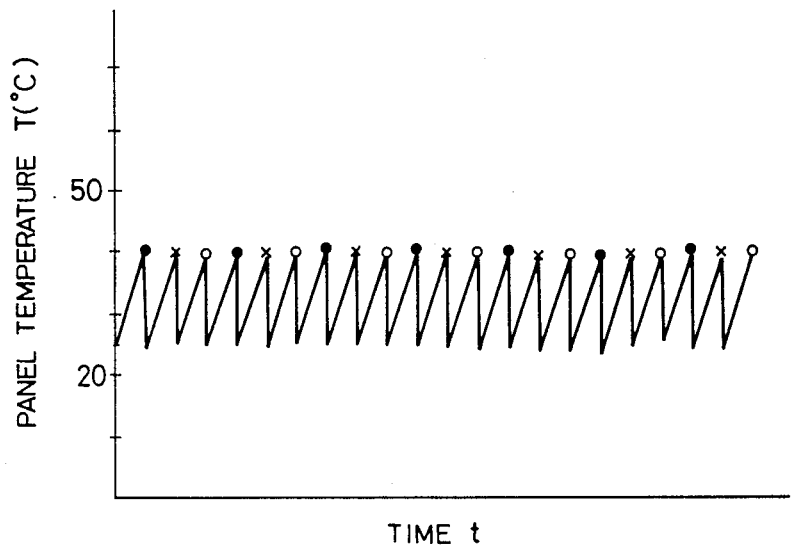
FIG. 5 is a graph showing the change of panel temperatures of color picture tubes with the passage of time when a method of regulating the temperature is employed in accordance with an embodiment of the present invention.

Using the thus constructed heater-moving device, the 14-inch panel 9a, 20-inch panel 9b and 26-inch panel 9c having different sizes were successively fed with their inner sides being faced to the electric heater 1 that radiated about 6 KW of output maintaining a distance l, and the panel temperatures T of the panels 9a, 9b, 9c were measured. The results were as shown in FIGS. 4 and 5. In these drawings, black circles represent measured values of the 14-inch panel 9a, marks X represent measured values of the 20-inch panel 9b, and open circles represent measured values of the 26-inch panel 9c. FIG. 4 shows the change of panel temperatures T with the lapse of time t of the case of a conventional art where the distance l is maintained at 150 mm constant, and FIG. 5 shows the change of panel temperatures T with the lapse of time t of the case of the present invention where the distance l was set to 250 mm for the panel of 14-inch picture tube, 200 mm for the panel of 20-inch picture tube, and 150 mm for the panel of 26-inch picture tube. The data of Tables 1 and 2 represent measured values corresponding to those of FIGS. 4 and 5. The panel temperatures shown in Tables 1 and 2 were those of after having been heated for 120 seconds. The room temperature was maintained at 25° C.

TABLE 1

| Panel number | Size (inches) | l (mm) | Panel temp. T (°C.) |
| --- | --- | --- | --- |
| 1 | 14 | 150 | 45 |
| 2 | 20 | 150 | 40 |
| 3 | 26 | 150 | 35 |
| 4 | 14 | 150 | 45 |
| 5 | 20 | 150 | 40 |
| 6 | 26 | 150 | 35 |
| 7 | 14 | 150 | 45 |
| 8 | 20 | 150 | 40 |
| 9 | 26 | 150 | 35 |
| 10 | 14 | 150 | 45 |
| 11 | 20 | 150 | 40 |
| 12 | 26 | 150 | 35 |
| 13 | 14 | 150 | 45 |
| 14 | 20 | 150 | 40 |
| 15 | 26 | 150 | 35 |

TABLE 2

| Panel number | Size (inches) | l (mm) | Panel temp. T (°C.) |
| --- | --- | --- | --- |
| 16 | 14 | 250 | 40 |
| 17 | 20 | 200 | 40 |
| 18 | 26 | 150 | 40 |
| 19 | 14 | 250 | 40 |
| 20 | 20 | 200 | 40 |
| 21 | 26 | 150 | 40 |
| 22 | 14 | 250 | 40 |
| 23 | 20 | 200 | 40 |
| 24 | 26 | 150 | 40 |
| 25 | 14 | 250 | 40 |
| 26 | 20 | 200 | 40 |
| 27 | 26 | 150 | 40 |

TABLE 2-continued

| Panel number | Size (inches) | l (mm) | Panel temp. T (°C.) |
|---|---|---|---|
| 28 | 14 | 250 | 40 |
| 29 | 20 | 200 | 40 |
| 30 | 26 | 150 | 40 |

Table 1 shows the conventional case where the panels were heated maintaining the distance l at 150 mm constant. In this case, the panel temperature T differs depending upon the size of panels 9a, 9b, 9c, and varies over a range of from 35° C. to 45° C. Therefore, it is impossible to heat the panels 9a, 9b, 9c of different sizes at a predetermined constant panel temperature T at high speeds. According to the present invention, on the other hand, the distance l is changed depending upon the size of the panels 9a, 9b, 9c, i.e., the distance l is decreased with the increase in the size in the order of 9a, 9b, 9c, to heat the panels at a predetermined constant temperature elevating rate. This makes it possible to heat the panels at a panel temperature T of 40° C. constant at high speeds as shown in Table 2. The distance l is changed as described below. Namely, the drive motor 11 is so actuated that the frame 4 moves in a predetermined direction responsive to signals produced depending upon the panels 9a, 9b, 9c that are successively fed to the position opposed to the frame 4 mounting the heater 1 as shown in FIGS. 3a and 3b. The frame 4 is moved in the direction A-A', whereby the shutter 12 attached to the frame 4 is detected by the position detecting sensors 13a, 13b, 13c that correspond to the sizes of panels 9a, 9b, 9c, and the frame 4 is stopped so that the corresponding panel is heated.

According to the above-mentioned regulating method, the panel temperature T can be maintained constant by changing the distance l depending upon the size of the panels 9a, 9b, 9c.

EXAMPLE 2

Figure 6:
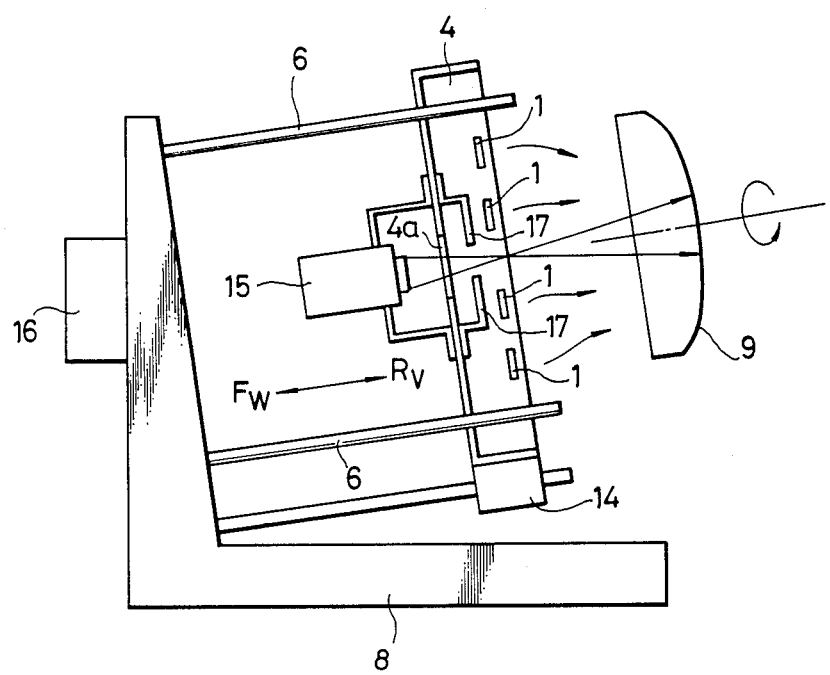
FIG. 6 is a side view showing a major portion of the heating apparatus used for regulating the temperature according to another embodiment of the present invention.

FIG. 6 is a side view showing a major portion of the heater-moving device to explain the method of regulating the temperature according to this embodiment and wherein the same or corresponding portions are denoted by the same reference numerals as in the above-mentioned figures. In the device of FIG. 6, the frame 4 is provided with a plurality of heaters 1 and an opening 4a in a portion thereof. In the opening 4a is mounted an infrared ray sensor 15 which senses wavelengths over a region of about 1 to 20 μm to always detect the temperature of the film applied to the inner surface of the panel 9 irrespective of the operation of a back-and-forth drive portion 14 which drives the heater 1 back and forth. Responsive to the surface temperature inside the panel measured as the infrared rays enter into the infrared ray sensor 15 from the inner surface of the panel 9, the heating rate or the temperature elevating rate (dT/dt) is regulated by changing the distance l. That is, as the inner surface of the panel 9 is irradiated with the heat from the heater 1 and is heated to a predetermined panel temperature Tc, a drive instruction in the Fw direction is given to the back-and-forth drive portion 14 to move the heater 1 backwardly. After the heater 1 is driven in the Fw direction, the predetermined heating temperature Tc is compared with a temperature Te detected by the infrared ray sensor 15 as it receives infrared rays radiated from the inner surface of the panel 9. When Tc>Te, the back-and-forth drive portion 14 is moved in the Rv direction. When Tc<Te, the back-and-forth drive portion 14 is moved in the Fw direction. These operations are repeated by a controller 16 to control the temperature of the panel 9.

To regulate the temperature more highly precisely, furthermore, a sensor 17 is provided at the back of the heater 1 to measure the temperature elevating rate of the panel 9 that is away from the heater 1 by a predetermined distance and that is irradiated with the heat from the heater 1, thereby to regulate the heating schedule according to the property of the material applied to the inner surface of the panel. In the aforementioned temperature elevating rate represented by the following equation, $$dT/dt = \frac{Qh}{mC}\left(1 - \frac{l}{\sqrt{l^2 + a^2}}\right)$$

furthermore, it can be easily considered that the change of heat quantity Qh is directly trasmitted to the panel 9 as the change of dT/dt. Therefore, in order that a constant amount of energy is emitted from the heater 1 at all times, a plate-like heat sensor (composed of, for example, platinum) is installed in the vicinity of the heater 1, and the surface temperature of the heater is regulated at a constant temperature (e.g., 350° C.) by controlling the supply power for the heater so that the heat sensor produces a constant output at all times.

According to the present invention as described above, bodies to be heated having different sizes, weights or specific heats can be treated at a constant temperature at all times, making it possible to produce products of various kinds simultaneously and maintaining a high precision.

What is claimed is:

1. A method of regulating the temperature of a body to be heated comprising the steps of:
   (i) placing a body to be heated in front of a heater to heat said body to be heated, the generated heat of said heater being maintained constant;
   (ii) changing the distance from said body to be heated to said heater by moving said heater depending upon the size, weight and specific heat of said body to be heated, so that said body to be heated is heated at a desired constant temperature elevating rate; and
   (iii) heating said body to be heated by said heater for a predetermined constant period of time
   wherein a plurality of separate bodies having different heat capacities are heated in succession; and
   wherein steps (i-111) are effected for one said body to be heated after said steps (i-iii) have been effected for at least one other body to be heated;
   wherein said body to be heated is a panel for a color picture tube.

2. A method of regulating the temperature according to claim 1, wherein the distance from said body to be heated to said heater is controlled for respective ones of said body to be heated placed in front of said heater.

3. A method of regulating the temperature according to claim 1, wherein said body to be heated is placed in front of a single heater, said single heater is positioned to be spaced said distance from said body to be heated, and said heater heats said body to be heated for said predetermined period of time while said body to be heated and said heater are maintained stationary.

4. A method of regulating the temperature of a panel of a color picture tube to be heated, wherein a plurality of separate panels for color picture tubes having different heat capacities are to be heated in succession, comprising the steps of:
  (i) placing one of the panels to be heated in front of a single heater to heat said one panel, the generated heat of said single heater being maintained constant;
  (ii) changing the distance from said one panel to be heated to said single heater by moving said single heater depending upon the size, weight, and specific heat of said one panel to be heated, so that said one panel to be heated is heated at a desired constant temperature elevating rate; and
  (iii) heating said one panel to be heated by said single heater for a predetermined constant period of time while said one panel and said signle heater are maintained stationary;

wherein steps (i–iii) are effected for said one panel to be heated after said steps (i–iii) have been effected for at least one other panel to be heated, wherein the distance from respective ones of said panels to be heated to said single heater is controlled for the respective ones of said panels to be heated placed in front of said single heater, and said single heater is positioned to be spaced said distance from a respective one of said panels to be heated according to the heat capacity thereof.

5. A method of regulating the temperature according to claim 4, wherein said single heater is moved by a drive motor in accordance with a signal indicative of the size, weight and specific heat of said panel to be positioned in front of said single heater, said drive motor stopping the movement of said single heater when said single heater reaches a position having a predetermined distance from said panel in accordance with said signal.

* * * * *